United States Patent
Koukol et al.

(10) Patent No.: US 9,269,272 B2
(45) Date of Patent: Feb. 23, 2016

(54) INDEPENDENT INSTRUMENT LANDING SYSTEM MONITOR

(71) Applicant: HONEYWELL INTERNATIONAL INC., Morristown, NJ (US)

(72) Inventors: Ondrej Koukol, Prague (CZ); Gang He, Morristown, NJ (US); Simon Innocent, Haute-Garonne (FR)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 145 days.

(21) Appl. No.: 14/227,613

(22) Filed: Mar. 27, 2014

(65) Prior Publication Data

US 2016/0012735 A1     Jan. 14, 2016

(51) Int. Cl.
| | |
|---|---|
| *G06F 19/00* | (2011.01) |
| *G08G 5/02* | (2006.01) |
| *G01S 19/15* | (2010.01) |
| *G01S 19/42* | (2010.01) |
| *B64D 45/04* | (2006.01) |

(52) U.S. Cl.
CPC .......... *G08G 5/02* (2013.01); *B64D 45/04* (2013.01); *G01S 19/15* (2013.01); *G01S 19/42* (2013.01)

(58) Field of Classification Search
None
See application file for complete search history.

(56) References Cited

U.S. PATENT DOCUMENTS

| | | | |
|---|---|---|---|
| 7,188,007 B2 * | 3/2007 | Boorman ............... | G01C 23/00 244/75.1 |
| 7,460,029 B2 * | 12/2008 | Boorman ............... | G01C 23/00 340/975 |
| 7,546,183 B1 | 6/2009 | Marcum | |
| 8,019,495 B2 | 9/2011 | Markiton et al. | |
| 8,423,207 B2 | 4/2013 | Davis et al. | |
| 8,494,693 B2 | 7/2013 | Murphy | |
| 2002/0040263 A1 | 4/2002 | Johnson et al. | |
| 2011/0035080 A1 * | 2/2011 | Murphy ............... | G01C 23/00 701/9 |
| 2012/0209457 A1 * | 8/2012 | Bushnell ............... | G01C 21/00 701/13 |
| 2012/0265376 A1 | 10/2012 | Fleiger-Holmes et al. | |
| 2014/0019034 A1 * | 1/2014 | Bushnell ............ | G01C 23/005 701/122 |

FOREIGN PATENT DOCUMENTS

JP     2002092799 A     3/2002

OTHER PUBLICATIONS

IFR; Instrument Landing System (ILS) and Distance Measuring Equipment (DME) Ground Receiver and Monitor Alarm Testing; Part No. 46891/901 Issue 1; 2001, www.ifrsys.com.
EP Extended Search Report for Application 15158529.6 dated Sep. 2, 2015.

* cited by examiner

*Primary Examiner* — Adam Alharbi
(74) *Attorney, Agent, or Firm* — Ingrassia Fisher & Lorenz, P.C.

(57) ABSTRACT

A system and method of monitoring received instrument landing system (ILS) signals onboard an aircraft includes performing a pre-approach sampling of the received ILS signals to thereby generate pre-approach phase ILS data. A statistical approach course of the aircraft is determined based at least in part on the pre-approach phase ILS data. A determination is made as to when the aircraft is below a predetermined activation altitude and, when it is, approach sampling of the received ILS signals is performed to generate approach phase ILS data. The approach phase ILS data is compared to the statistical approach course to determine a course deviation. An alert signal is selectively generated when the course deviation exceeds a predetermined magnitude.

15 Claims, 4 Drawing Sheets

INDEPENDENT INSTRUMENT LANDING SYSTEM MONITOR

TECHNICAL FIELD

The present invention generally relates to aircraft instrument landing systems, and more particularly relates to an independent instrument landing system (ILS) monitor.

BACKGROUND

The approach to landing and touch down on the runway of an aircraft is one of the most challenging tasks a pilot undertakes during normal aircraft operations. To perform the landing properly, the aircraft approaches the runway within an envelope of attitude, course, speed, and rate of descent limits. The course limits include, for example, both lateral limits and glide slope limits. An approach outside of this envelope can result in an undesirable positioning of the aircraft with respect to the runway, resulting in a possible discontinuance of the landing attempt.

In some instances visibility may be poor during approach and landing operations, resulting in what is known as instrument flight conditions. During instrument flight conditions, pilots rely on instruments, rather than visual references, to navigate the aircraft. Even during good weather conditions, pilots typically rely on instruments to some extent during the approach. Many airports and aircraft include runway assistance landing systems, such as an Instrument Landing System (ILS), to help guide aircraft during approach and landing operations. The ILS allows a lateral deviation indicator to indicate aircraft lateral deviation from the approach course, and a glide slope indicator to indicate vertical deviation from the glide slope.

A conventional ILS includes a localizer subsystem and a glide slope subsystem. The localizer subsystem includes a localizer antenna array that radiates an RF carrier signal that is amplitude modulated with equal amplitudes of 90 Hz and 150 Hz tones. A localizer receiver onboard an aircraft demodulates these signals and drives the lateral deviation indicator. The glide slope subsystem includes a glide slope antenna array that radiates an RF carrier signal that is also amplitude modulated with equal amplitudes of 90 Hz and 150 Hz tones. A glide slope receiver on-board the aircraft demodulates these signals and drives the glide slope indicator.

Though rare, there have been instances where an aircraft is taking off from the same runway that an aircraft is about to land, and temporarily interferes with the ILS signals. This temporary interference can cause the ILS signals to be imbalanced. If the imbalance is of a sufficient duration, it can cause the aircraft flight control/autopilot system to undergo and unneeded and undesirable maneuver. In one particular documented case, the undesirable maneuver caused the aircraft to land on the left main landing gear only. The different forces caused the aircraft to temporarily slide off the runway. This incident, and future incidents, may be avoided if the crew is provided with an on-board ILS signal monitoring function that will alert the crew that an automatically determined maneuver is not compatible with the actual intended course direction. Presently, no such function is provided.

Hence, there is a need for a system and method that will alert the crew that an automatically determined maneuver, based on received ILS signals, is not compatible with the actual intended course direction. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method of monitoring received instrument landing system (ILS) signals onboard an aircraft includes performing a pre-approach sampling of the received ILS signals to thereby generate pre-approach phase ILS data. A statistical approach course of the aircraft is determined based at least in part on the pre-approach phase ILS data. A determination is made as to when the aircraft is below a predetermined activation altitude and, when it is, approach sampling of the received ILS signals is performed to generate approach phase ILS data. The approach phase ILS data is compared to the statistical approach course to determine a course deviation. An alert signal is selectively generated when the course deviation exceeds a predetermined magnitude.

In another embodiment, a system for independently monitoring received instrument landing system (ILS) signals onboard an aircraft includes an ILS receiver, an altimeter, and a processor. The ILS receiver is adapted to receive and demodulate ILS signals. The altimeter is configured to sense aircraft altitude and supply altitude data representative of the sensed aircraft altitude. The processor is in operable communication with the localizer receiver and the altimeter. The processor is configured, in response to the altitude data, to determine when the aircraft is in pre-approach phase and when the aircraft is in an approach phase. The processor is further configured to sample, during the pre-approach phase, the ILS signals demodulated by the localizer receiver to thereby generate pre-approach phase ILS data, determine a statistical approach course of the aircraft based at least in part on the pre-approach phase ILS data, sample, during the approach phase, the ILS signals demodulated by the localizer receiver to thereby generate approach phase ILS data, compare the approach phase ILS data to the statistical approach course to determine a course deviation, and selectively generate an alert signal when the course deviation exceeds a predetermined magnitude.

In yet another embodiment, a system for independently monitoring received instrument landing system (ILS) signals onboard an aircraft includes an ILS receiver, a global positioning system (GPS) receiver, an altimeter, and a processor. The ILS receiver is adapted to receive and demodulate ILS signals. The GPS receiver is configured to determine aircraft position and supply aircraft position data representative thereof to the processor. The altimeter is configured to sense aircraft altitude and supply altitude data representative of the sensed aircraft altitude. The processor is in operable communication with the localizer receiver, the GPS receiver, and the altimeter. The processor is configured, in response to the aircraft position data, to determine actual aircraft position. The processor is configured, in response to the altitude data, to determine when the aircraft is in a pre-approach phase and when the aircraft is in an approach phase. The processor is further configured to sample, during the pre-approach phase, the ILS signals demodulated by the localizer receiver to thereby generate pre-approach phase ILS data, determine a statistical approach course of the aircraft based on the determined aircraft position and the pre-approach phase ILS data, sample, during the approach phase, the ILS signals demodulated by the localizer receiver to thereby generate approach phase ILS data, compare the approach phase ILS signals to the statistical approach course to determine a course deviation, determine when the course deviation exceeds a predetermined magnitude for a predetermined time period, and generate an alert signal when the course deviation exceeds the predetermined magnitude for the predetermined time period.

Furthermore, other desirable features and characteristics of the ILS monitoring system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
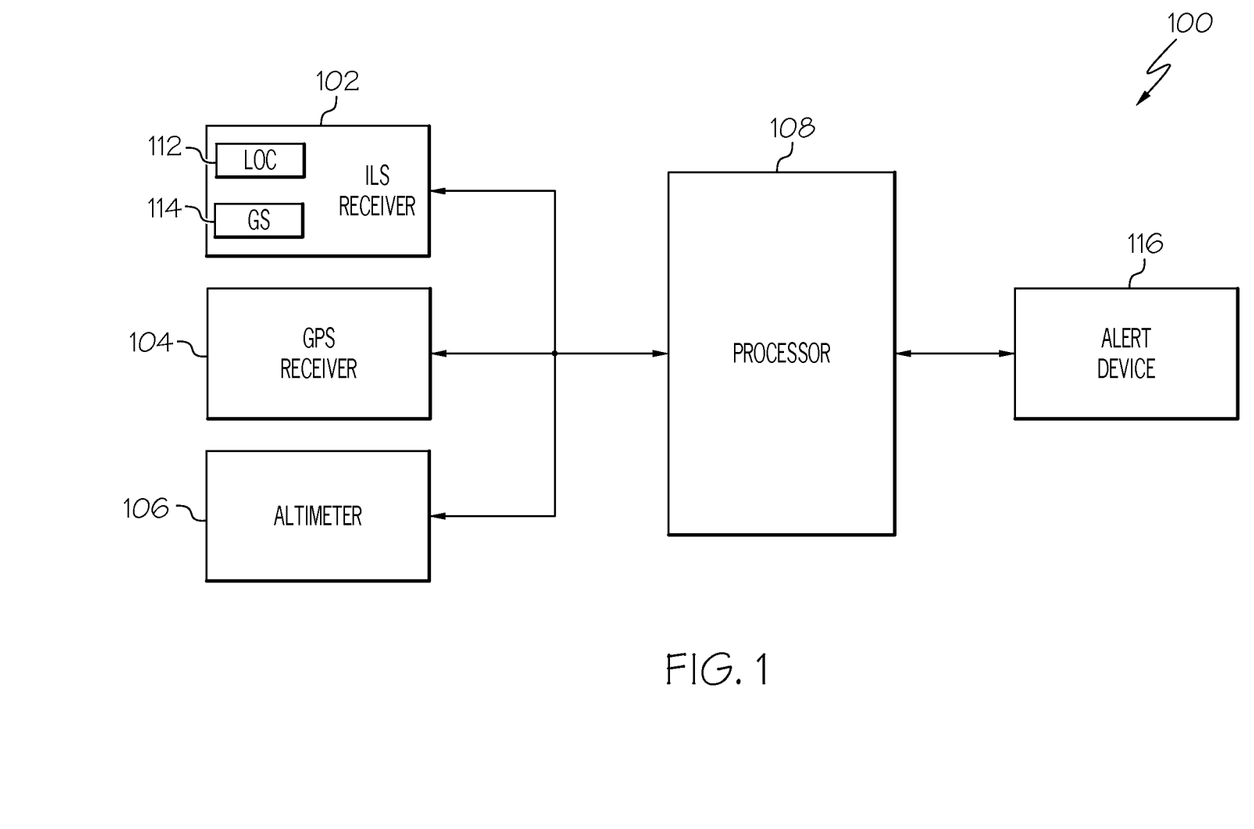
FIG. 1 depicts a functional block diagram of a portion of one embodiment of an aircraft avionics system.

Referring first to FIG. 1, a functional block diagram of a portion of one embodiment of an aircraft avionics system 100 is depicted. The portion that is depicted is a system 100 for independently monitoring received instrument landing system (ILS) signals, and includes an ILS receiver 102, a global positioning system (GPS) receiver 104, an altimeter 106, and a processor 108. The ILS receiver 102 is adapted to receive and demodulate ILS signals that are transmitted from an ILS. For completeness, a brief description of a conventional ILS will now be provided.

As is generally known, the ILS is a radio navigation system that provides aircraft with horizontal (or localizer) and vertical (or glide slope) guidance just before and during landing and, at certain fixed points, indicates the distance to the reference point of landing on a particular runway. A typical ILS 200, such as the one depicted in FIG. 2, includes ground-based transmission subsystems that transmit radio frequency signals. These subsystems include a localizer subsystem 202, and a glide slope subsystem 204. The localizer subsystem 202 provides lateral guidance to aircraft for tracking the runway centerline, and the glide slope subsystem 204 provides vertical guidance to aircraft for descending at the proper glide path.

Figure 2:
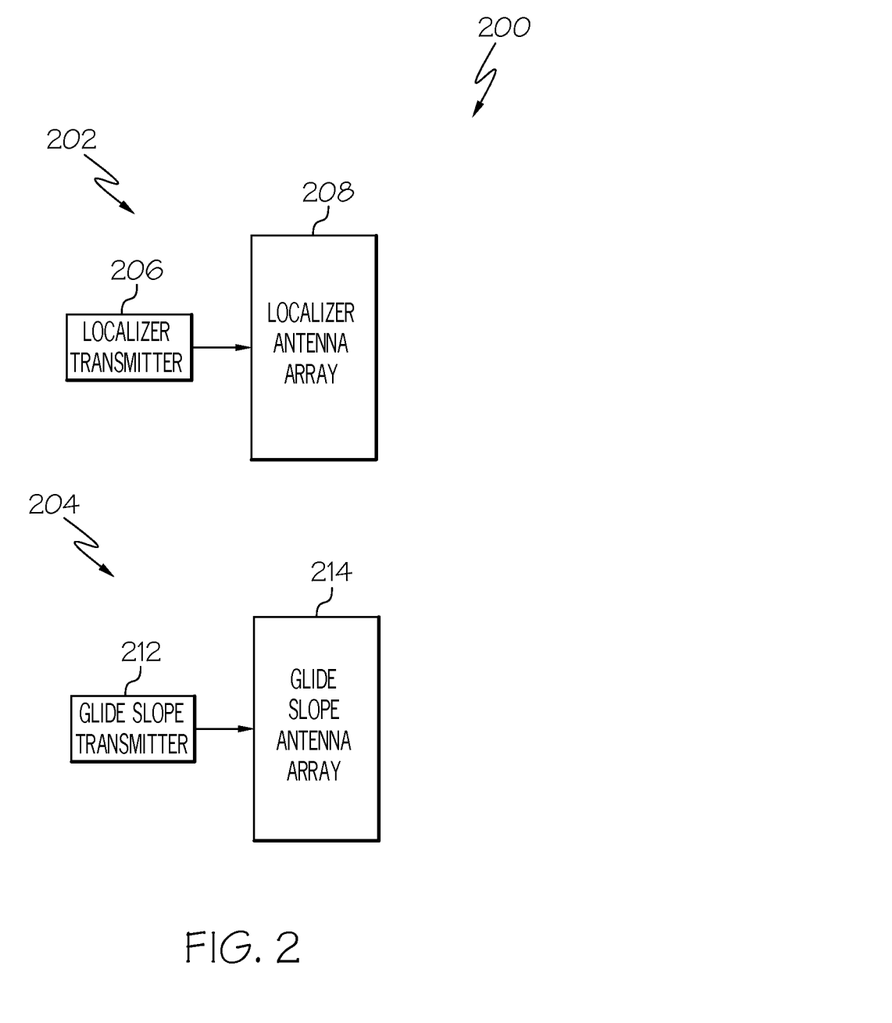
FIG. 2 depicts a functional block diagram of a typical instrument landing system.

The localizer subsystem 202 includes a localizer transmitter 206 and a localizer antenna array 208. The localizer transmitter 206 generates and supplies the localizer signal to the localizer antenna array 208. The localizer signal, as is generally known, is an RF carrier signal that is amplitude modulated with equal amplitudes of 90 Hz and 150 Hz tones. The localizer antenna array 208 receives and radiates the localizer signal. The localizer radiation pattern is arranged such that the 90 Hz and 150 Hz tones have equal levels when the receiving aircraft is aligned with the runway centerline.

The glide slope subsystem 204 includes a glide slope transmitter 212 and a glide slope antenna array 214. The glide slope transmitter 212 generates and supplies the glide slope signal to the glideslope antenna array 214. The glideslope signal, like the localizer signal, is an RF carrier signal that is amplitude modulated with equal amplitudes of 90 Hz and 150 Hz tones. The glide slope radiation pattern is arranged such that the 90 Hz and 150 Hz tones will have equal levels when the receiving aircraft is descending at the desired glide path angle.

Returning now to FIG. 1, the ILS receiver 102 is adapted to receive the ILS signals transmitted by the ground-based ILS 200 and is configured, using known demodulation techniques, to determine both the lateral deviation and the glide slope deviation of the aircraft. As is generally known, the lateral deviation represents the difference between the desired aircraft lateral approach for the particular runway and the actual aircraft lateral approach, and the vertical deviation represents the difference between the desired aircraft glide slope for the particular runway and the actual aircraft glide slope.

To implement the above-described functionality, and as FIG. 1 further depicts, the ILS receiver 102 may be implemented with both a localizer receiver 112 and a glide slope receiver 114. The localizer receiver 112 is configured to demodulate the received localizer signal, and the glide slope receiver 114 is configured to demodulate the received glide slope signal. It will be appreciated that the localizer and glide slope receivers 112, 114 may be disposed within the same physical unit or may be implemented as separate units. Either way, these two receivers 112, 114, as used herein, comprise the ILS receiver 102.

The GPS receiver 104 is configured to determine aircraft position and supply aircraft position data representative thereof. Although the GPS receiver 104 may be variously implemented, in the depicted embodiment it is a multi-channel receiver, with each channel tuned to receive one or more of the GPS broadcast signals transmitted by the constellation of GPS satellites (not illustrated) orbiting the earth. As is generally known, each GPS satellite encircles the earth two times each day, and the orbits are arranged so that at least four satellites are always within line of sight from almost anywhere on the earth. The GPS receiver 104, upon receipt of the GPS broadcast signals from at least three, and preferably four, or more of the GPS satellites, determines the distance between the GPS receiver 104 and the GPS satellites and the position of the GPS satellites. Based on these determinations, the GPS receiver 104, using a technique known as trilateration, determines at least aircraft position and supplies data representative thereof to the processor 108. It will be appreciated that the GPS receiver 104 may also be configured, if needed or desired, to determine various other aircraft parameters, such as groundspeed and ground track angle.

The altimeter 106 is configured to sense aircraft altitude and supply altitude data representative thereof. It will be appreciated that the altimeter 106 may be implemented using various types of sensors now known or developed in the future. These sensors may include various types of inertial sensors, various pressure-based sensors, and various radar-based sensors, just to name a few. Regardless of the specific implementation, the altimeter supplies the altitude data to the processor 108.

The processor 108 is in operable communication with the GPS receiver 104, and thus receives the aircraft position data therefrom. The processor 108 is configured, in response to the aircraft position data, to determine actual aircraft position. The processor 108 is also in operable communication with the altimeter 106, and thus receives the altitude data therefrom. The processor is additionally configured, in response to the altitude data, to determine when the aircraft is in the pre-approach phase and when the aircraft is in the approach phase.

Before proceeding further, it is noted that the pre-approach phase, as used herein, means that the aircraft is within range of the ILS, and is thus receiving the ILS signals, but is above an altitude of about 500 feet above the approach runway touchdown zone, for example. It is additionally noted that the approach phase, as used herein, means the aircraft is below an altitude of about 500 feet above the approach runway touchdown zone.

Returning now to the description, it is seen that the processor 108 is additionally in operable communication with the ILS receiver 102. The processor 108 is further configured to sample the ILS signals that are demodulated by the ILS receiver 102 and, in response, to generate, what are referred to herein as, either pre-approach phase ILS data or approach phase ILS data. In particular, during the pre-approach phase, the ILS data that are generated by the processor 108 are referred to herein as pre-approach phase ILS data. Similarly, during the approach phase, the ILS data that are generated by the processor 108 are referred to herein as approach phase ILS data. The reasons for this will now be described.

When the processor 108 determines that the aircraft is in the pre-approach phase, as described above, the processor 108 determines, based on the determined aircraft position and the pre-approach phase ILS data, a statistical approach course of the aircraft. As used herein, a statistical approach course refers to an approach course that is generated based on the pre-approach ILS data and the aircraft position data. For example, aircraft position and corresponding ILS lateral deviation data can be compared such that the statistical aircraft traveling direction along these GPS data points can be used to determine the course direction by examining the data points that cross zero lateral deviation values. Preferably, the statistical approach course includes the deviation of the aircraft from the desired approach course, as determined by the aircraft position and the pre-approach ILS data. The statistical approach course, as will be described momentarily, is used to monitor the received ILS signals during the approach phase to determine if the ILS signals experience any disturbances outside of predetermined limits. As such, it is assumed that the ILS signals, during the pre-approach phase, are relatively stable. In the event, however, ILS signal oscillation is observed while aircraft position changes smoothly, the signals associated with the short duration ILS signal oscillation can be removed from the statistical data analysis process. In another words, the processor 108 is further configured to implement statistical filters, based on the signal stability of the GPS or on board inertial systems, to eliminate any such disturbances.

Now, when processor 108 determines that the aircraft is in the approach phase, as described above, the processor 108 compares the approach phase ILS data to the statistical approach course to determine a course deviation. The onboard avionics systems generate a real-time course that the aircraft is traveling, and this course should match the course indicated by the ILS receiver data during normal operations. Moreover, the course or direction of aircraft travel should match the statistically approach course. If the ILS signal is perturbed but still indicates normal values, the processor 108 can look at the current course of travel as it is affected by the perturbed ILS signal and compares that to the statistically generated course numbers to make a determination when the course deviation exceeds a predetermined magnitude. In some embodiments, the processor 108 is further configured to determine when the course deviation exceeds the predetermined magnitude for a predetermined time period. Although the deviation magnitude(s) and predetermined time period may vary, in one particular embodiment a magnitude of 0.4 degrees course change is used, and a time period of about 2 seconds is used as an example.

The processor 108 is additionally configured to selectively generate an alert signal. In particular, the processor 108 is configured to generate an alert signal when the course deviation exceeds the predetermined magnitude and, in a particular preferred embodiment, when it does so for the predetermined time period. As such, the system 100 may additionally include an alert device 116. The alert device 116, if included, is coupled to receive the alert signal and is configured, in response thereto, to generate an alert stimulus. It will be appreciated that the alert device 116 may be variously configured and implemented to generate various types of alert stimuli. For example, the alert device 116 may be configured as an aural alert device that generates aural alert stimuli, a visual alert device that generates visual alert stimuli, a haptic alert device that generates haptic alert stimuli, or a combination of two or more these devices to thereby generate two or more of these alert stimuli.

Figure 3:
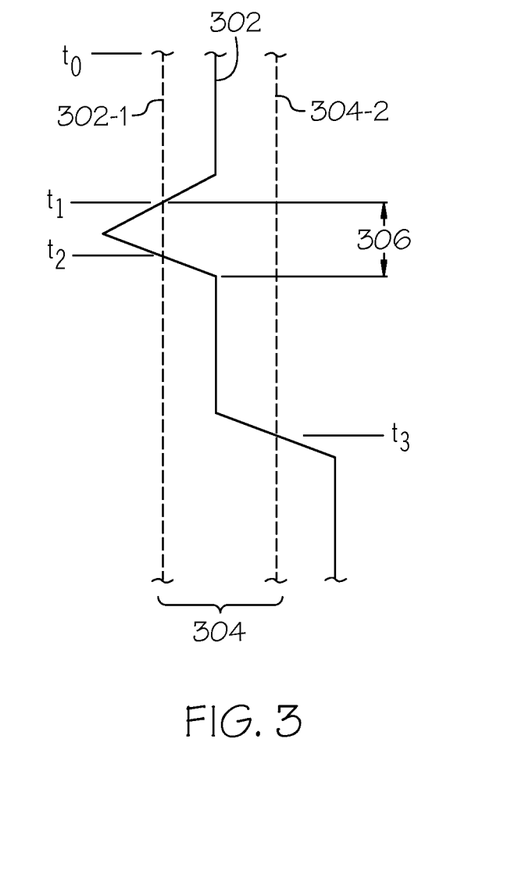
FIG. 3 graphically depicts an exemplary course deviation that is determined by the system of FIG. 1 during an aircraft approach phase.

As an example of the above-described functionality, reference should now be made to FIG. 3, which depicts an exemplary course deviation 302 that is determined during the approach phase is illustrated. Between time $t_0$ and $t_1$, the course deviation 302 remains within the predetermined magnitude 304 (e.g., between two deviation limits 304-1, 304-2). At time $t_1$, the course deviation exceeds the predetermined magnitude, and does so until time $t_2$. However, the time interval between $t_1$ and $t_2$ is less than the predetermined time period 306. Thus, the processor 108 does not generate an alert signal. At time $t_3$, the course deviation once again exceeds the predetermined magnitude, but this time it does so for a time period that is greater than the predetermined time period 306. Thus, the processor 108 does generate an alert signal.

Figure 4:
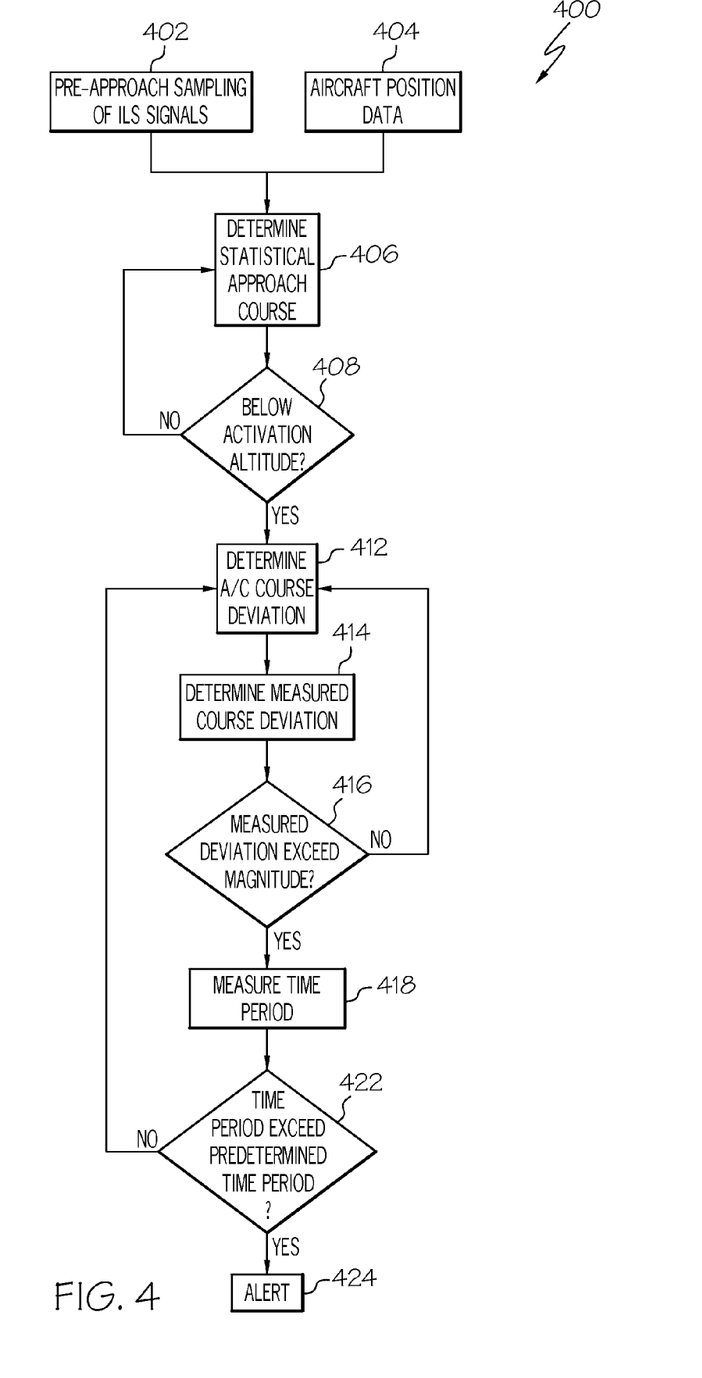
FIG. 4 depicts a process, in flowchart form, that is implemented in the system of FIG. 1.

The above-described process that is implemented in the system 100 is depicted in flowchart form in FIG. 4, and for completeness will also be described. The process 400 begins when the aircraft begins receiving ILS signals. At that point, the processor 108 begins performing a pre-approach sampling of the received ILS signals (402) and, at least in the depicted embodiment, begins processing the aircraft position data (404). The processor 108, using these data, begins determining the statistical approach course of the aircraft (406). The processor 108 then determines if the aircraft is below a predetermined activation altitude (408), which corresponds to initiation of an ILS approach. The processor 108 continues determining the statistical approach course until the aircraft is below the predetermined activation altitude.

When the aircraft is below the predetermined activation altitude, the processor 108 begins performing approach sampling of the received ILS signals to determine the aircraft course deviation (412). The approach ILS data are compared to the statistical approach course to determine a measured course deviation (414). The processor 108 then determines if the course deviation exceeds the predetermined magnitude (416). If not, then the previous steps (412-414) repeat. If it does, however, the processor 108, at least in the depicted embodiment, measures the time period that the course deviation exceeds the predetermined magnitude (418), and then determines if the measured time period exceeds the predetermined time period (422). If the measured time period does not exceed the predetermined time period, then the previous steps (412-422) are repeated. If the measured time period does exceed the predetermined time period, then an alert signal is generated (424).

The system and method described herein will alert the crew that an automatically determined maneuver, based on received ILS signals, is not compatible with the actual intended course direction. The system and method provide onboard monitoring of the ILS signal quality by using a recorded statistical approach course to monitor the received ILS signal and to determine any disturbances outside of a predetermined magnitude.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of monitoring received instrument landing system (ILS) signals onboard an aircraft, the method comprising the steps of:
    performing, with a processor, a pre-approach sampling of the received ILS signals to thereby generate pre-approach phase ILS data;
    determining, in the processor, a statistical approach course of the aircraft based at least in part on the pre-approach phase ILS data;
    determining, in the processor, when the aircraft is below a predetermined activation altitude; and
    when the aircraft is below the predetermined activation altitude:
        performing, with the processor, approach sampling of the received ILS signals to generate approach phase ILS data;

comparing, in the processor, the approach phase ILS data to the statistical approach course to determine a course deviation;

determining, in the processor, when the course deviation exceeds a predetermined magnitude for a predetermined time period; and selectively generating, with the processor, an alert signal when the course deviation exceeds the predetermined magnitude for the predetermined time period.

2. The method of claim 1, wherein the step of determining the statistical approach course comprises:

determining a desired approach course based on the pre-approach sampled ILS signals; and determining deviation of the aircraft from the desired approach course.

3. The method of claim 1, wherein the step of determining the statistical approach course comprises:

using separate signal sources to determine if the pre-approach ILS data is to be used to determine the statistical course generating process.

4. The method of claim 1, further comprising:

determining, in the processor, actual position of the aircraft; and determining the statistical approach course based additionally on the determined position.

5. The method of claim 1, further comprising:

generating an alert stimulus using the alert signal.

6. The method of claim 5, wherein the alert stimuli is selected from the group consisting of an aural alert, a visual alert, a haptic alert, and a combination of two or more of an aural alert, visual alert, and haptic alert.

7. A system for independently monitoring received instrument landing system (ILS) signals onboard an aircraft, comprising:

an ILS receiver adapted to receive and demodulate ILS signals;

an altimeter configured to sense aircraft altitude and supply altitude data representative of the sensed aircraft altitude; and a processor in operable communication with the localizer receiver and the altimeter, the processor configured, in response to the altitude data, to determine when the aircraft is in pre-approach phase and when the aircraft is in an approach phase, the processor further configured to:

sample, during the pre-approach phase, the ILS signals demodulated by the localizer receiver to thereby generate pre-approach phase ILS data;

determine a statistical approach course of the aircraft based at least in part on the pre-approach phase ILS data;

sample, during the approach phase, the ILS signals demodulated by the localizer receiver to thereby generate approach phase ILS data;

compare the approach phase ILS data to the statistical approach course to determine a course deviation;

determine when the course deviation exceeds the predetermined magnitude for a predetermined time period; and selectively generate an alert signal when the course deviation exceeds a predetermined magnitude for the predetermined time period.

8. The system of claim 7, wherein the processor is further configured to:

determine a desired approach course based on the pre-approach phase ILS data;

determine deviation of the aircraft from the desired approach course; and determine the statistical approach course based on the desired approach and the deviation.

9. The system of claim 7, further comprising:

a global positioning system (GPS) receiver configured to determine aircraft position and supply an aircraft position data representative thereof to the processor, wherein the processor is further configured, in response to the aircraft position data, to determine actual aircraft position and determine the statistical approach course based additionally on the determined aircraft position.

10. The system of claim 7 further comprising:

an alert device coupled to receive the alert signal and configured, in response thereto, to generate an alert stimulus.

11. The system of claim 10, wherein the alert device is selected from the group consisting of an aural alert device, a visual alert device, a haptic alert device, and a combination of two or more of an aural alert device, visual alert device, and haptic alert device.

12. A system for independently monitoring received instrument landing system (ILS) signals onboard an aircraft, comprising:

an ILS receiver adapted to receive and demodulate ILS signals;

a global positioning system (GPS) receiver configured to determine aircraft position and supply aircraft position data representative thereof to the processor, an altimeter configured to sense aircraft altitude and supply altitude data representative of the sensed aircraft altitude; and a processor in operable communication with the localizer receiver, the GPS receiver, and the altimeter, the processor configured, in response to the aircraft position data, to determine actual aircraft position, the processor configured, in response to the altitude data, to determine when the aircraft is in a pre-approach phase and when the aircraft is in an approach phase, and the processor further configured to:

sample, during the pre-approach phase, the ILS signals demodulated by the localizer receiver to thereby generate pre-approach phase ILS data;

determine a statistical approach course of the aircraft based on the determined aircraft position and the pre-approach phase ILS data;

sample, during the approach phase, the ILS signals demodulated by the localizer receiver to thereby generate approach phase ILS data;

compare the approach phase ILS signals to the statistical approach course to determine a course deviation;

determine when the course deviation exceeds a predetermined magnitude for a predetermined time period; and generate an alert signal when the course deviation exceeds the predetermined magnitude for the predetermined time period.

13. The system of claim 12, wherein the processor is further configured to:

determine a desired approach course based on the determined aircraft position and the pre-approach phase ILS data;

determine deviation of the aircraft from the desired approach course; and determine the statistical approach course based on the desired approach and the deviation.

14. The system of claim 12, further comprising:
an alert device coupled to receive the alert signal and configured, in response thereto, to generate an alert stimulus.

15. The system of claim 14, wherein the alert device is selected from the group consisting of an aural alert device, a visual alert device, a haptic alert device, and a combination of two or more of an aural alert device, visual alert device, and haptic alert device.

* * * * *